(12) United States Patent
Aizen et al.

(10) Patent No.: US 8,706,757 B1
(45) Date of Patent: Apr. 22, 2014

(54) DEVICE, METHOD AND COMPUTER PROGRAM PRODUCT FOR GENERATING WEB FEEDS

(75) Inventors: Jonathan Aizen, San Francisco, CA (US); Eran Shir, Kfar Saba (IL)

(73) Assignee: Yahoo! Inc., Sunnyvale, CA (US)

( * ) Notice: Subject to any disclaimer, the term of this patent is extended or adjusted under 35 U.S.C. 154(b) by 538 days.

(21) Appl. No.: 11/868,981

(22) Filed: Oct. 9, 2007

Related U.S. Application Data

(60) Provisional application No. 60/901,115, filed on Feb. 14, 2007.

(51) Int. Cl.
*G06F 17/30* (2006.01)

(52) U.S. Cl.
USPC ........................................................ 707/772

(58) Field of Classification Search
None
See application file for complete search history.

(56) References Cited

U.S. PATENT DOCUMENTS

| | | | | |
|---|---|---|---|---|
| 2002/0111966 A1* | 8/2002 | Fukuda et al. | | 707/513 |
| 2004/0002967 A1* | 1/2004 | Rosenblum et al. | | 707/3 |
| 2005/0193010 A1* | 9/2005 | DeShan et al. | | 707/104.1 |
| 2005/0267973 A1* | 12/2005 | Carlson et al. | | 709/228 |
| 2005/0289147 A1* | 12/2005 | Kahn et al. | | 707/10 |
| 2006/0053376 A1* | 3/2006 | Ng et al. | | 715/742 |
| 2006/0167860 A1* | 7/2006 | Eliashberg et al. | | 707/3 |
| 2006/0230021 A1* | 10/2006 | Diab et al. | | 707/3 |
| 2006/0230055 A1* | 10/2006 | Marcjan et al. | | 707/102 |
| 2006/0287989 A1* | 12/2006 | Glance | | 707/3 |
| 2006/0288329 A1* | 12/2006 | Gandhi et al. | | 717/114 |
| 2007/0027932 A1* | 2/2007 | Thibeault | | 707/200 |
| 2007/0050175 A1 | 3/2007 | Schmelzer et al. | | 702/186 |
| 2007/0156809 A1* | 7/2007 | Dickinson et al. | | 709/203 |
| 2007/0204010 A1* | 8/2007 | Sah et al. | | 709/219 |
| 2007/0225047 A1 | 9/2007 | Bakos | | 455/566 |
| 2007/0239674 A1 | 10/2007 | Gorzela | | 707/3 |
| 2007/0250577 A1 | 10/2007 | Veeramachaneni et al. | | 709/206 |
| 2008/0046543 A1 | 2/2008 | Chasen et al. | | 709/219 |
| 2008/0088735 A1* | 4/2008 | Biniak et al. | | 348/468 |
| 2008/0147606 A1* | 6/2008 | Read et al. | | 707/3 |
| 2008/0235594 A1* | 9/2008 | Bhumkar et al. | | 715/738 |
| 2008/0295164 A1* | 11/2008 | Steiner et al. | | 726/14 |

OTHER PUBLICATIONS

Belles et al., A Flexible Framework for Engineering "My" Portals, May 17-22, 2004, WWW2004, NY, New York, ACM 1-58113-844-X/04/2005.*

* cited by examiner

*Primary Examiner* — Ajay Bhatia
*Assistant Examiner* — Grace Park
(74) *Attorney, Agent, or Firm* — Brinks Gilson & Lione

(57) ABSTRACT

A method for generating a feed, the method includes: receiving selection information representative of a selection of a selected element out of multiple elements of a web content representation; and generating an equivalent indication representative of at least one equivalent element that is similar to the selected elements.

8 Claims, 4 Drawing Sheets

400

Change similarity detection 502

Select 505

Select inside 506

Web page area 510

Feed preview area 550

Selected elements area 520

Fields area 525

Groups area 530

500

DEVICE, METHOD AND COMPUTER PROGRAM PRODUCT FOR GENERATING WEB FEEDS

RELATED APPLICATIONS

The present invention claims the priority of U.S. provisional patent filing date Feb. 14, 2007 and Ser. No. 60/901,115 which is incorporated herein by reference.

FIELD OF THE INVENTION

The present invention relates to a method, a device and a computer program product for generating web feeds.

BACKGROUND OF THE INVENTION

Web feeds (also referred to as feeds or channels) are data formats used for serving users frequently updated content. A web feed can include multiple items. U.S. patent application serial number 2006/0288329 of Gandhi et al., which is incorporated herein by reference, illustrates a content syndication platform.

Content distributors syndicate a web feed, thereby allowing users to subscribe to it, accordingly only content that is included in a predefined web feed can be syndicated. Content distributors sometimes also define a programmatic interface to their content (also known as an API), which allows programmatic access to the content.

There is a growing need to provide a more flexible and yet simple system, method and computer program product for defining distributable content from any web source, not just those that have a predefined feed or API. For example, this is a key requirement in the creation of "web mashups" (programmatic combination of content from multiple web sites and other data sources) which assume the existence of feeds and APIs.

SUMMARY OF THE PRESENT INVENTION

A method for generating a feed, the method includes: receiving selection information representative of a selection of a selected element out of multiple elements of a web content; and generating an equivalent indication representative of at least one equivalent element that is similar to the selected elements.

A computer program product of a computer readable medium usable with a programmable computer, the computer program product having computer-readable code embodied therein for generating a web feed, the computer-readable code includes instructions for: receiving selection information representative of a selection of a selected element out of multiple elements of a web content representation; and generating an equivalent indication representative of at least one equivalent element that is similar to the selected element.

A system for generating a feed, the system includes: a memory unit adapted to store selection information representative of a selection of a selected element out of multiple elements of a web content representation; and a processor, adapted to generate an equivalent indication representative of at least one equivalent element that is equivalent to the selected element.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
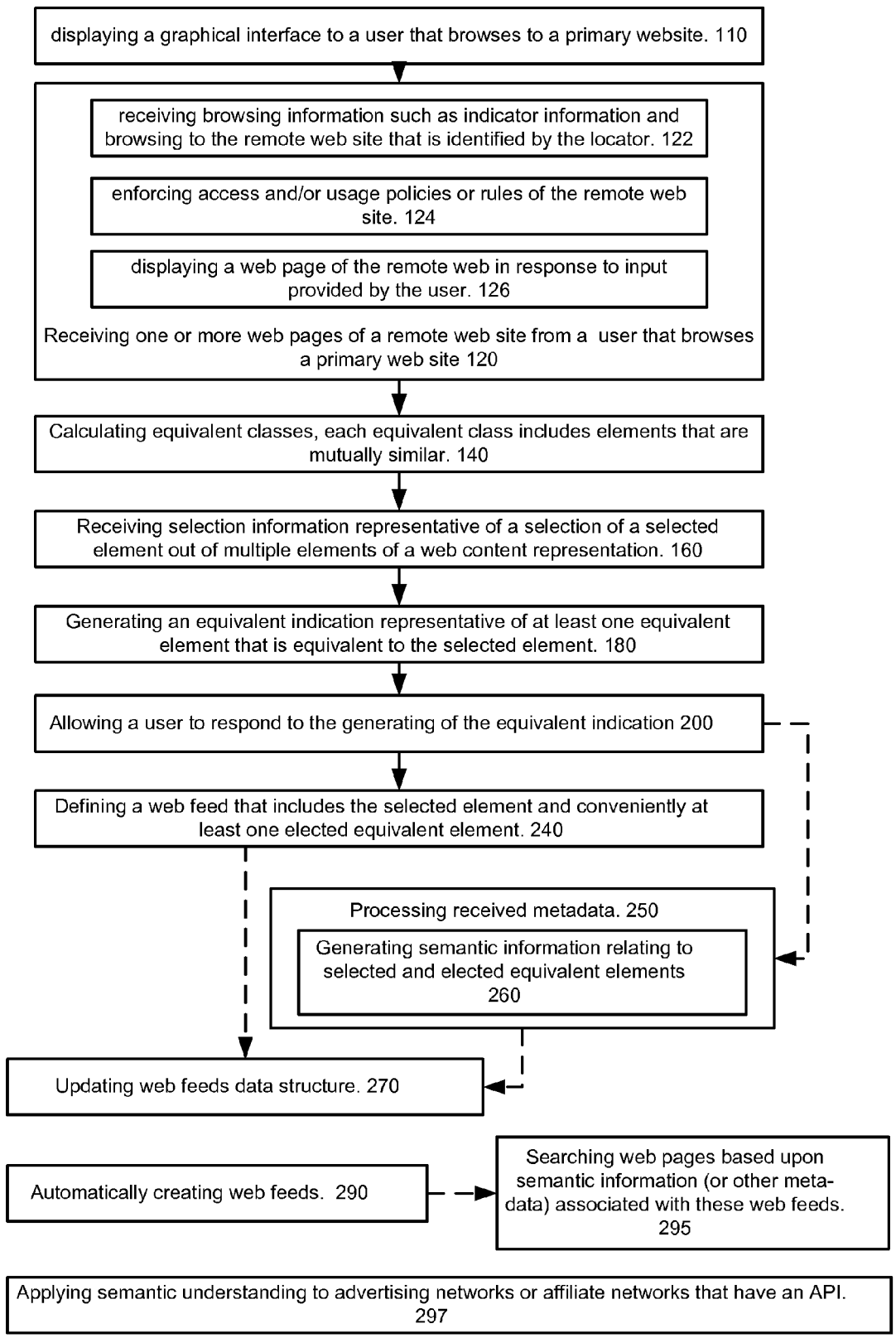
FIG. 1 illustrates a method for generating a web feed, according to an embodiment of the invention and also initial uses of such feed creation techniques.

The term "feed" as used herein below refers to preconfigured feeds such as RSS feeds, and dynamic feeds that require input before providing the feed also known as APIs.

The term "web content" as used herein below refers to content accessible over the Internet. It may include a web page, a portion of a web page, information that is included in a web page, and the like.

The method, computer program product and system for generating and distributing web feeds.

The system maintains a primary website that can be accessed by users that wish to generate web feeds, update web feeds or delete web feeds. Once a user browses to the primary website the system enables the user to define a new web feed or update an existing web feed by using a graphical interface.

A web feed is created once and can then be distributed repeatedly (or according to predefined schedule) in order to obtain desired content from a remote website associated therewith in a structured format. In this sense, the method, computer program product and system are a visual application programming interface (API) creator for any website, without the need for programming.

The content of a remote website is retrieved by the web feed while being formatted in a structured format. This content can be used by the system to manipulate, transform, and use the content. The content can be processed by programs that can be accessed via the primary web site but this is not necessarily so. For example, users can create their own programs in any programming language that use the output of any available web feed.

The web feed creation process entails browsing the remote website inside the primary website, defining which portions (elements) of the content of the remote website will be desired in the future, and assigning semantic meanings (in the form of a name and groupings) to these content elements (e.g. "Article Author"). When the web feed is distributed (for example—when the user requests content via the web feed), the system extracts the desired content from the remote website as it exists at that point in time, and then names each piece of content using the semantic definitions that the user originally supplied. As a result of the aggregate assignment of semantic information to portions of websites, the system builds, over time, a semantic understanding of the web.

In order to define a web feed, users go through an interactive visual process. This process entails supplying the system with one or more exemplary pages on a remote website which include content of interest. The exemplary pages conveniently have the same layout and structure, but different content (e.g. the results of several searches on a search engine). Furthermore, the user can choose input variables (e.g. "search term" or login information) through a visual interface on the primary website.

Once the user has submitted the exemplary pages on the remote website, the system performs an algorithmic analysis of these exemplary pages. This analysis identifies similarities between the different exemplary pages and between elements within each exemplary pages. The result is programmatic understanding of the pages' structures which gets stored and is used as the basis for the new web feed.

The user selects desired content by clicking on various elements in the exemplary pages and assigns a name to each content type (e.g. "Search Result Title"). The user can also define and name relationships between content types, including grouping several content types together (e.g. "Search Result Title" and "Search Result Summary" belong to a "Search Result"). This process is entirely visual and point-and-click, thereby allowing a user to construct a sophisticated and powerful API with no programming.

The web feed is encoded within the system as a mapping between the names (and additionally or alternatively tags or attributes) the user supplied and the technical information necessary to extract the relevant content from any instance of similar pages on the website. In addition to this, the web feed may be described by additional metadata that the user supplies such as data type (string, integer etc.), length and other attributes. In addition the user may define for each content type (field) a certain constrain or post processing rule (e.g. regular expression which removes strings matching "X" or a delimiter string that dissects the content into multiple instances)

According to an embodiment of the invention the web feed can become readily available for users of the system. The individual contributions of each user construct a comprehensive database that enables a complete coverage of the web in the form of semantic understanding and programmatic interaction with websites.

In order to interact with any web feed, a user uses or creates software that communicates with the system over the web using a URL. As such, the output of any web feed is available on the web at a specific address. The URL provides the mechanism for supplying variable inputs and requesting the desired output, as well as the means for passing the relevant contents on which to run various algorithms that can be applied by the system.

Upon receiving any such request, the system runs its algorithms on the content of the remote website as it exists at that moment in time, and compares its results to the mapping stored in the web feed. Using this method, the system extracts the relevant content and names the content pieces using the mapping defined by the user during the creation phase. The system returns the named content in any of several formats, including XML.

In addition to user-created web feeds, the system is capable of the automatic creation of new web feeds and modification of existing web feeds. By automatically examining similarities between web contents, the system is able to harness the information of an existing web feed to improve upon it or create a new web feed. This provides the system with an ever-growing coverage of the web which is not restricted by the need for user interaction.

The system interfaces between content owners or content providers and content consumers. According to an embodiment of the invention, the system can enforce content usage and/or content access limitations imposed by the content owners or content providers. For example, content providers can specify preferences and terms of use for their content using a web-based interface. Content consumers are able to register their needs and agree to the terms set forth by content providers. This embodiment provides both the technological means to access the content provider's content as well as the legal legitimacy required to do so. The content exchange platform allows for various forms of compensation to the content owner from the content consumer, including financial, link-driven traffic, and brand exposure. The system can automatically create, enforce, and execute a business agreement between the two parties.

According to various embodiments of the invention semantic information captured by the system in the web feed creation phase and through automatic web-service creation can be leveraged in a variety of ways. The system semantic understanding of websites can be used to enable searching the web using semantic information (e.g. "find all pages that contain recipes with less than 200 calories.") In doing so, the system empowers existing information retrieval tools that treat the web as a structured dataset to locate and retrieve information in a more powerful and precise manner.

According to yet further embodiments of the invention this semantic understanding can be applied to advertising networks to better match and target advertisements to content. By using the method, system and computer program product to create a feed and semantically describe their site, website owners can place semantic based advertisements that directly relate to an understanding of the content, as opposed to traditional methods of keyword matching (e.g. "provide a link to my supermarket checkout with a pre-filled shopping cart whenever a list of ingredients exists."). For advertising or affiliate network feeds that have an API website owners can also use this semantic information to programmatically select between existing affiliate network feeds to choose both the most appropriate merchant and dynamically display the most appropriate merchant products for each page on their site. If the merchant, or advertiser does not have an appropriate web feed, this invention can be used to easily create such a web feed.

The system and especially web feed related information can be utilized by applications, services, websites, and devices that reuse content from the web. This content is either owned by the content user or by a third party.

Conveniently, equivalency engine 430 is being used in the two processes of creating a new web feed and running an existing web feed over a page. However, its input and output is different. At the creation process, the equivalency engine receives a sample of pages upon which it runs and executes all of the ECMs. The result of this process is the assignment of a set of keys (per ECM) for every element in the page. This mapping between keys and elements is then used in the GUI of the system. As described above, the user chooses an element in the GUI. When a user chooses an element she, in effect, chooses a (possibly complete) sub-set of keys associated with the element, and can add additional characteristics such as pattern matching constraints. The user is provided with visual feedback from the system as it singles out the other elements in the page that share keys with the element chosen. So to further the example described above, if the user clicked on an element whose tag is a link (<a href="X"></a>), all of the other links in the page will be highlighted, representing all elements that are also links. Through the GUI, the user can then define intuitively the set of keys (e.g. key that relates to the ECM matching element tags) and the value of the key (<a> tag) she'd like as output of the web feed she defines.

The web feed distribution process is conducted after the web feed has been defined, and the subsets of keys and their respective values have been defined by the user, along with any other characteristics she saw fit. The equivalency engine performs a different task in this mode. It gets as input the page to run on, along with the chosen set of keys, their values and other characteristics. Then the Runner runs over the provided page, executing the ECMs and producing values for all of the keys. As it runs over the page and produces keys, it checks against the uploaded web feed definition, looking for matching elements and content that got key values equal to the ones stored in the WS. If there is a match and the other characteristics are met, the element content is added to the structured content output. At the end of the process, the equivalency engine outputs the structured content aggregated during the pass over the page.

There are two modes, one for regular users and one for power users. Regular users don't select keys directly, but rather either by clicking directly on the content, or by clicking on various controls. The regular, direct click algorithm takes into account the prior state of the element that receives the click, the tagset on the element, and other elements that have already been selected. The algorithm analyzes this information and then modifies the set of selected items appropriately—while trying to minimize the changes to selection that the user made (as opposed to those selected algorithmically). The regular interface may also provide various controls, for example: (i) A table control that give the user control to select table specific artifacts from a page (e.g. a column or row); (ii) An isolation control which allows the user to limit the scope of search for equivalent elements; (iii) A sensitivity control which gives the user control over the number and type of keys used for equivalence; (iv) A regular expression control which allows the user to select sub-parts of an elements content.

A power mode can be used to select key combinations directly. In this mode the user is made aware through the GUI of the various sets of keys available and can select sets of keys directly.

FIG. 1 illustrates method 100 for generating a web feed according to an embodiment of the invention.

Method 100 starts by stage 110 of displaying a graphical interface to a user that browses to a primary website. Such a web site can be www.dapper.net, but this is not necessarily so.

According to an embodiment of the invention the graphical interface includes a window for inserting a remote web page locator such as a Uniform Resource Locator. The graphical interface also includes various mechanisms to allow a user to browse in order to find the appropriate page.

Stage 110 is followed by stage 120 of receiving one or more web pages of a remote web site from a user that browses to the primary web site. The web pages can be received one at a time, after being selected by the user. The selection utilizes the graphical interface.

Stage 120 can include: (i) stage 122 of receiving browsing information such as indicator information and browsing to the remote web site that is identified by the locator, (ii) stage 124 of enforcing access and/or usage policies or rules of the remote web site, (iii) stage 126 of displaying a web page of the remote web in response to input provided by the user, and the like.

It is noted that stage 124 of enforcing can include preventing a user to access the remote web site, preventing the user from accessing a certain web page of the remote web site, preventing the user from downloading certain content, conditioning the access to content or retrieval of content, and the like. The conditioning can include limiting the number of accesses of the user per time period, require the user to pass one or more tests (such as inserting text representative of a wrapped image), can require the user to pay for access of for certain information, and the like. In this sense the primary web site enables the remote web site to enforce its access and/or usage policies.

It is noted that these access and/or usage policies can be applied each time the remote web site is accesses or content is retrieved during a distribution of a web feed that includes content from that remote web site.

Stage 120 can involve multiple repetitions of either one of stage 122-126 such as to provide one or more web pages for analysis.

Stage 120 is followed by stage 140 of calculating equivalent classes, each equivalent class includes web content representation elements that are mutually equivalent.

According to an embodiment of the invention stage 140 includes calculating equivalent classes by an equivalency engine (also referred to as equivalency engine or core engine). At the end of stage 120 the equivalency engine can receive one or more sample web pages or URLs that form a sample set. The sample set can be of any size, from a single page upwards.

According to various embodiments of the invention if the sample set includes multiple web pages than the equivalency engine can differentiate between static elements (static content) and the dynamic elements (dynamic content) within the sample set. The differentiating can include ignoring dynamic elements. Static content is defined as content that repeats on any or many of the samples while dynamic content includes content that changes from page to page. For example, if three samples of different search results from a search engine will all consider the logo of the search engine to be static content, but will contain different results, unique to each page, which will be considered dynamic.

According to various embodiments of the invention stage 140 can include at least one of the following or a combination thereof: (i) calculating at least one key for each element; (ii) storing the at least one key per element; (iii) calculating multiple keys of different abstraction level per element; (iv) choosing to store a subset of the associated keys, thus defining the strictness and looseness of the field definition; (v) calculating equivalent classes in response to structural characteristics of the elements; (vi) determining an equivalency of a first element and a second element in response to a characteristic of equivalent elements of the first element and a characteristic of the second element; (vii) calculating equivalent classes in response to previous elections of the user; (viii) calculating equivalent classes in response to elections of another user; (ix) calculating equivalent classes in response to an indication representative of an equivalency level of an equivalency class; (x) calculating equivalent classes in response to an indication representative of a scope of a search for equivalent element.

According to an embodiment of the invention stage 140 the calculating of equivalency classes includes linking elements in a web content representation (such as in a document object module (DOM) representation of a web page or another semi-structured web format such as but not limited to RSS). Equivalence can be defined as structural equivalence and can be defined by one or more different heuristics.

Conveniently, keys generated during stage 120 allow for easy identification of classes of web page sub-trees that have equivalent structure. The keys can be assigned based upon key definitions that can be updated over time. These keys are conveniently robust to changes on a page.

A sample equivalence class describes the "Most Complex Structure" (MCS) within a DOM representation of a web page which is the oldest (closest to the root of the DOM) but has a similar static sub-tree structure.

The MCS computation algorithm can use examples to differentiate between static and dynamic elements in a page (static elements do not change for different instances of a page, while dynamic elements can change for each instance of a page). For example if a user searched for the term "dapper" on Google™ (thus the web site www.google.com is the remote web site then the search result will include multiple web pages that have a similar structure (simplified for illustration purposes): (i) Title—*Bolded version of the search term*; (ii) Description—*Bolded version of the search term*, URL, Size, "Cached: link, "Similar pages" link, "Note this" link, "More results" link. It is noted that dynamic elements are in italics. They do not show up for every repeating structure.

Conveniently, stage 120 includes calculates keys that describe the element and its relative structure within the DOM. These keys are used to calculate similarity between different structures. Different types of keys can be used in order to compute different types of equivalences (or similarity)

A key is computed for each element which describes a structural characteristic of the element. An element with multiple children that have the same key, defines a Most Complex Structure (MCS) which is the oldest (closest to the root of the DOM) but has a similar static sub-tree structure. For elements that have no such MCS the root tag (HTML) is considered the MCS ancestor. Each MCS defines an MCS element key which defines it as an MCS, and allows elements to easily be linked to their MCS ancestor.

Conveniently, stage 120 includes generating an internal key for each element. This internal key element includes multiple attributes such as: (i) HTML tag, (ii) static content of the element (where applicable); (iii) MCS ancestor (where applicable); and (iv) relative offset from the MCS ancestor (using a DFS numbering scheme—where applicable).

Conveniently, stage 120 includes generating a cousin key for each element. The cousin key includes: (i) a tag, (ii) an MCS Tag, (iii) an MCS Key, (iv) an absolute level (from the root of the tree), and (v) relative level from MCS ancestor.

According to an embodiment of the invention stage 120 further includes generating easily retrievable data structures representative of the equivalency classes. Samples of easily retrievable data structures can include: (i) a first list of all of an elements descendant tags; (ii) a second list that includes an element's level, tag_name, EKMC.

Stage 120 conveniently includes a heuristic determining that two elements are equivalent if a ratio between the number of unique first list elements (that exist in only in one MCS) and the number of first list elements in their union is less than some constant.

Stage 120 can assign a unique key per each table element, another key per each table row, a further key per each table column and yet a further key for all the cells of the table.

Yet according to another embodiment of the invention stage 140 can include utilizing one or more equivalency class that was calculated in the past. These equivalency classes can be calculated in relation to one or other users, can be responsive to inputs of one or more other users and the like. Thus, instead of calculating new equivalency classes stage 120 can involve utilizing previously calculated equivalency classes.

Stage 140 is followed by stage 160 of receiving selection information representative of a selection of an element out of multiple elements of a web content representation. The selection can be made by simply clicking on a selected element of a web page of a remote web site that is being displayed to the user.

Stage 160 is followed by stage 180 of generating an equivalent indication representative of at least one equivalent element that is similar to the selected element. Stage 180 can include emphasizing equivalent elements of the displayed web page. The emphasis can include highlighting equivalent elements, surrounding these equivalent elements by a frame, or utilizing any known graphical technique.

Stage 180 is followed by stage 200 allowing a user to respond to the generation of the equivalent indication. The user can perform at least one of the following or a combination thereof: (i) elect at least one equivalent element and optionally define its associated meta-data and/or semantic information; (ii) de-elect at least one equivalent element; (iii) de-select the selected element; (iv) elect a non-equivalent element; (v) change at least one characteristic of the similarity algorithm.

It is noted that multiple iterations of stage 180 can occur and the user can provide an end of stage indication before method 100 continues to stage 240.

It is further noted that the response of the user can cause method 100 to try to find a minimal equivalency class such as to include only the selected element and the equivalent elements that were selected (or not de-selected) by the user.

Stage 200 can include waiting for a certain period (that can be time limited) but this is not necessarily so. The user can receive reminders that urge him to either perform one or more of the mentioned above operations) or to terminate the election stage. It is noted that the user can perform multiple elections.

Stage 200 is followed by stage 240 of defining a web feed. The web feed will include a selected element and can include one or more equivalent elements. The one or more equivalent elements can be selected by the user (either by positively electing the equivalent element or by merely not de-selecting an equivalent element).

Conveniently, the generation of a web feed also involves receiving and processing metadata such as but not limited to semantic content. The metadata can include linking information that links between selected items, a user definition of one or more selected items, and the like.

For example, a user can define hierarchies by creating a group of elements. This definition is received during stage 200. The user can choose (and the method receives) any combination of elements and previously defined groups of elements to define a new group. Once a group is defined (conveniently by the user) the method receives metadata that reflects relationships between repeating instances of different elements. For example, assume that during stage 120 multiple search result web pages are received. A typical search result web page includes search results, each including a title with a link to the search result and a summary of the page linked. After defining two fields: "title" and "summary", the user can define a group named "search result" that will facilitate an association of the first result title with the first result summary, the second result title with the second result summary, and so on, allowing an equivalency engine to return results in an hierarchically structured format. Optionally, the user can also define more complex hierarchies such as groups inside groups and groups that contain both groups and fields. Once the user has finished defining the fields and groups, she can give the web feed a name and additional meta-data such as tags and description, save it and start using it.

Stage 200 is also followed by stage 250 of processing received metadata. The metadata (and semantic information) relates to the selected element and to equivalent elements. The metadata can relate to elected equivalent elements.

Stage 250 includes mapping between names included in received metadata and technical information necessary to extract relevant content from any instance of similar pages on the website. It can also include creating an XML representation of the feed to be created. The web feed data structure can include information relating to web feeds generated by users as well as information that associate between related web feeds. Web feeds can be related to each other if they associated with similar metadata (especially similar semantic metadata). Similarity between web feeds can be learnt from the identity of users that subscribed and/or defined the web feeds. If certain users subscribed to certain web feeds they can be associated to each other. Statistics relating to the subscription to web feeds, timing between subscription to different web feeds, identity of users that subscribed to different web feeds, unsubscribing from web feeds, and/or metadata that links the web feeds to each other can provide an indication about the association level between different web feeds.

The web feed data structure or at least portion thereof (especially semantic information relating to web feeds) can be exposed to multiple users. According to an embodiment of the invention the web feed can become readily available for users of the system. The individual contributions of each user can construct a web feed data structure that enables a significant (even full) coverage of the web in the form of semantic understanding and programmatic interaction with websites.

Conveniently, stage 250 is followed by stage 270 of creating the appropriate a web feed format. The user can select the type of feed requested and the system creates the web feed from the internal XML.

Conveniently, method 200 includes stage 290 of automatically creating web feeds and, additionally or alternatively modifying existing web feeds. Stage 290 can include examining similarities between web pages, based upon the content of the web feed data structure. For example if after running the standard key generating algorithms another web site has the same set of keys (or similar keys based on some heuristic), the system can use the same selections and semantic information provided by the user for the original web site.

According to an embodiment of the invention method 200 includes stage 295 of searching web pages based upon semantic information (or other meta-data) associated with these web feeds (e.g. "find all web pages that include recipes with less than 200 calories.").

According to an embodiment of the invention method 200 includes stage 297 in which semantic understanding can be applied to advertising networks or affiliate networks that have an API. Website owners can use this semantic information to programmatically select between existing affiliate network feeds to choose both the most appropriate merchant and dynamically display the most appropriate merchant products for each page on their site. If the merchant or advertiser does not have an appropriate web feed, this invention can be used to easily create such a web feed.

According to other embodiments of the invention the system can be used to better match and target advertisements, or merchandise to content. Website owners can place the system semantic powered advertising that directly relates to an understanding of the content, as opposed to traditional methods of keyword matching (e.g. "provide a link to my supermarket checkout with a pre-filled shopping cart whenever a list of ingredients exists.")

After creating a web feed, the user may choose to edit the web feed or create a new web feed based on it. The process of editing a web feed is conveniently similar to the process of creating one, except for the fact that the user need not supply the pages to work on and the web feed is pre-defined.

Figure 2:
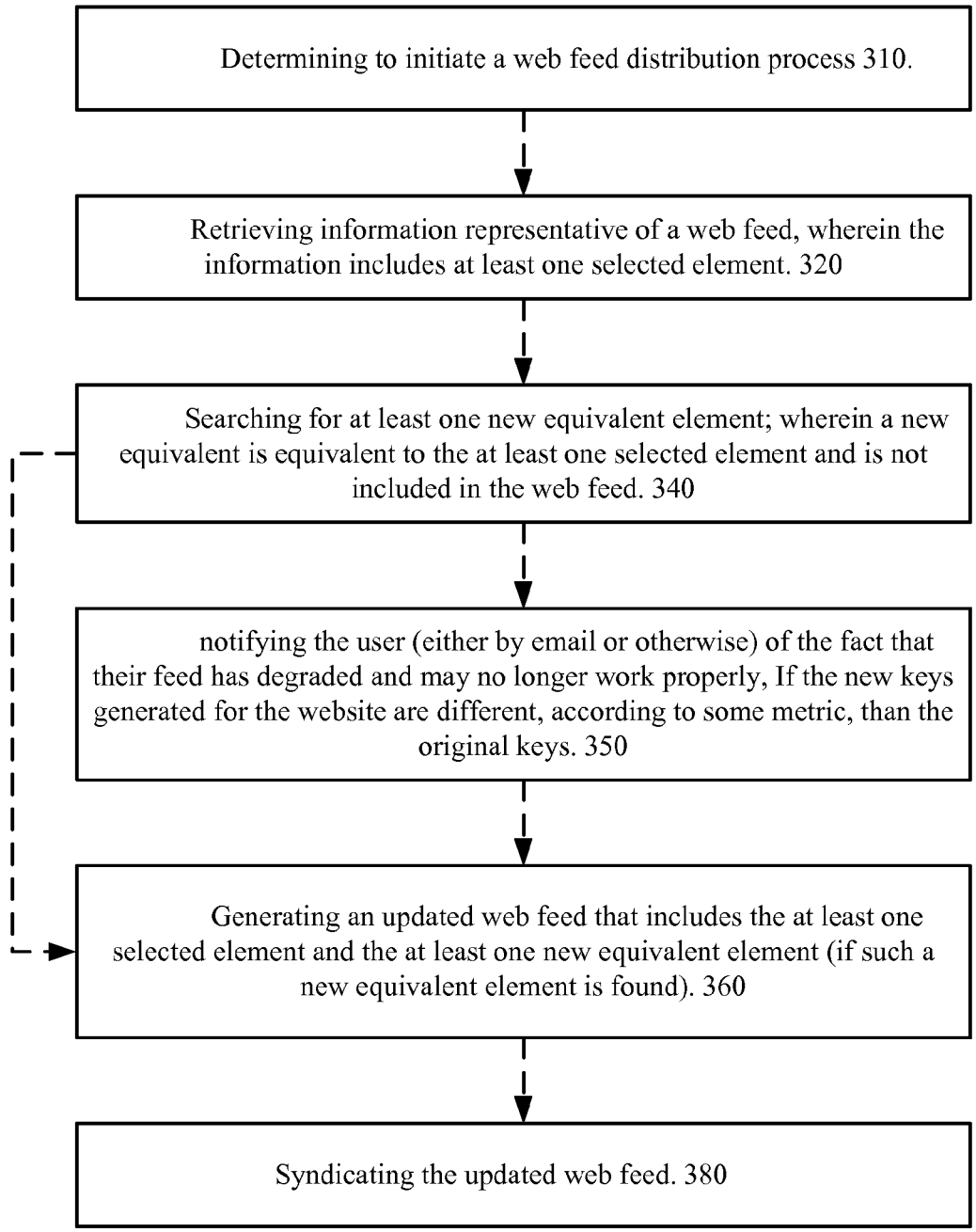
FIG. 2 illustrates a method for distributing a web feed, according to an embodiment of the invention.

FIG. 2 illustrates method 300 for distributing a web feed according to an embodiment of the invention.

Stage 310 starts by stage 310 of determining to initiate a web feed distribution process or receiving a trigger that triggers a web feed distribution process.

Stage 310 is followed by stage 320 of retrieving information representative of a web feed, wherein the information includes at least one selected element.

Stage 320 is followed by stage 340 of searching for at least one new equivalent element; wherein a new equivalent is equivalent to the at least one selected element and is not included in the web feed. Stage 340 can include generating the newly retrieved web page and calculating equivalency classes, in a manner than is analogues to stage 120.

Stage 340 is followed by stage 350 If the new keys generated for the website are different, according to some metric, than the original keys—then the system will notify the user (either by email or otherwise) of the fact that their feed has degraded and may no longer work properly as described in stage 350.

Stage 340 is followed by stage 360 of generating an updated web feed that includes the at least one selected element and the at least one new equivalent element, if the at least one new equivalent element was found during stage 340.

Stage 360 is followed by stage 380 of syndicating the updated web feed.

Figure 3:
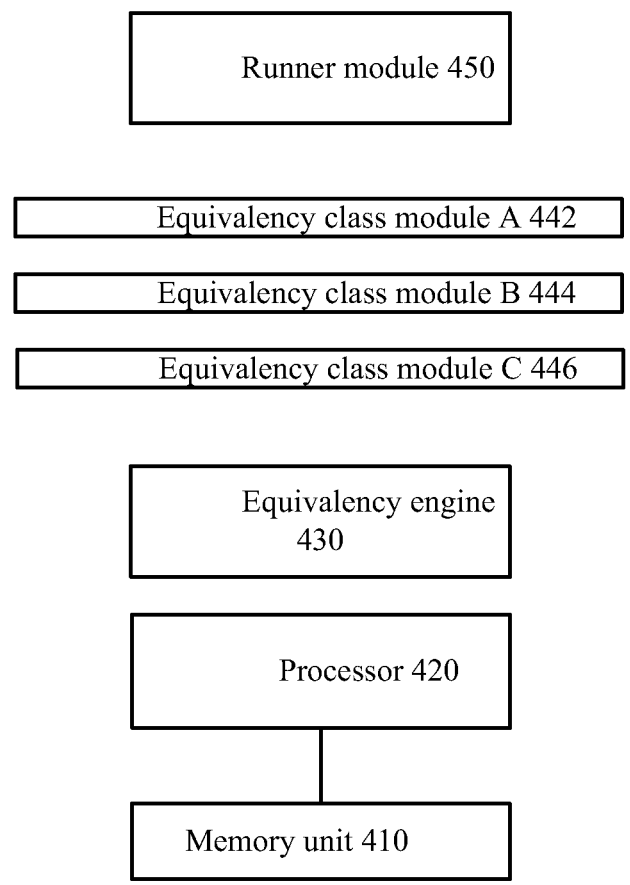
FIG. 3 illustrates a system according to an embodiment of the invention.

FIG. 3 illustrates system 400 according to an embodiment of the invention.

System 400 can include various software, firmware, middleware and/or hardware components. It is typically connected to users via one or more networks.

System 400 may represent practically any type of computer, computer system or other programmable electronic device. System 400 may be connected in a network or may be a stand-alone device in the alternative. System 400 can be connected to other devices via wired and/or wireless links. It is noted that system 400 can be characterized by a centralized architecture but that it can also be characterized by a distributed architecture. Accordingly, the various components of system 400 can be located near each other, but this is not necessarily so.

FIG. 3 illustrates system 400 as including memory unit 410, and processor 420. Memory unit 410 is adapted to store information representative of a web feed, wherein the information includes at least one selected element. Memory unit 410 can store the web feed data structure or portions thereof.

Processor 420 is adapted to search for at least one new equivalent element. A new equivalent is equivalent to at least one selected element that and is not included in the web feed. Processor 420 is also adapted to generate an updated web feed that includes the at least one selected element and the at least one new equivalent element; and to syndicate the updated web feed.

It is noted that system 400 can perform various stages of method 100 and, additionally or alternatively, can perform various stages of method 300.

According to an embodiment of the invention memory unit 410 is adapted to store selection information representative of a selection of selected elements out of multiple elements of a web content representation, and processor 420 is adapted to generate an equivalent indication representative of at least one equivalent element that is similar to the selected elements; wait for a user to elect at least one equivalent element; and define a web feed that comprises the selected element and at least one equivalent element, if at least one equivalent element exists.

FIG. 3 also illustrates various modules. These modules can be software modules that are executed by processor 420 but this is not necessarily so.

Equivalency engine 430 can calculate equivalency classes, can locate elements that are equivalent to selected elements, and the like.

Equivalency class modules A-C 442-446 are sample equivalency engines. Each includes information representative of mutually equivalent elements. These modules as well as additional modules (such as metadata module) can form a web feed data structure.

Runner module 450 scans web pages and sends elements of these web pages to the equivalency engine.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus excluding an electromagnetic signal that can contain, store, communicate, propagate, or transport the program for use by or in connection with the instruction execution system, apparatus, or device.

Figure 4:
FIG. 4 illustrates a screen displayed to a user, according to an embodiment of the invention.
Figure 4:
Figure 4:
Figure 4:
Figure 4:
Figure 4:
Figure 4:
Figure 4:

During the definition of a web feed multiple screens can be displayed to the user. FIG. 4 illustrates an illustrative sample screen 500 that is presented to a user during the definition of the web feed, according to an embodiment of the invention.

Screen 500 includes various control icons 502, 505 and 506, web page display area 510, selected element area 520 and group area 530. It is noted the screen is displayed after a user browses to the primary website and enters a URL or other information that represents a web site that is displayed (or one of its pages is displayed). It is noted that the user can also select the format of the web feed.

Web page display area 510 is used to display web pages, either in their original format or including highlighted elements that can represent a selected element and, additionally or alternatively, one or more equivalent elements.

Control icon "change similarity detection" 502 can be used to determine which equivalency algorithm is used and, additionally or alternatively, what is the equivalency level required to define two elements as equivalent items. Control icon "select" 505 allows a selection of a selected element. Control icon "select inside" 506 allows a display of a portion of an element. Selected element area 520 is used to display selected elements. Field area 525 is used to display the field names given to selected elements. Group area 530 is used to display groups and the elements included in the groups. It is noted that names or other attributes of elements and groups can be displayed within areas 520 and 530. It also contains an interactive feed preview area 550.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method comprising:
at a processor,
  determining that a web feed user has browsed to a primary website;
  providing data defining a web page of the primary website to the web feed user, including:
    providing data defining a graphical user interface,
    providing data defining a window in the graphical user interface for inserting a remote web page locator; and
    providing data defining a web page display area for displaying a remote website within the web page display area of the primary website;
  receiving browsing information from the web feed user identifying one or more remote web pages generated by the remote website that are of interest to the web feed user;
  updating the data defining the web page display area of the primary website to display the one or more remote web pages within the web page display area of the primary website;
  identifying elements of the one or more remote web pages, the identified elements each having one or more associated keys;
  determining structural similarities between the identified elements using at least the one or more associated keys;
  grouping in equivalence classes a subset of the identified elements which are determined to be structurally similar based at least on the one or more associated keys;
  receiving selection information from the web feed user via an input interface of the web page display area, the selection information identifying a selected element of the identified elements;
  identifying at least one equivalent element among the identified elements that is structurally similar to the selected element by determining that the at least one equivalent element belongs to a same equivalence class as the selected element;
  updating the data defining the web page display area to include data visually emphasizing the at least one equivalent element within the remote web pages displayed in the web page display area;
  receiving election information from the web feed user, the election information confirming that one or more elected elements elected by the web feed user from the identified at least one equivalent element are structurally similar to the selected element;
  defining a web feed which includes the selected element and the one or more elected elements; and
  subsequently, automatically distributing the defined web feed to the web feed user.

2. The method of claim 1 wherein distributing the defined web feed to the web feed user comprises:
at the processor,
  retrieving information representative of the web feed including the selected element;
  searching data of the one or more remote web pages to identify new equivalent elements which are equivalent to the selected element;
  adding to the web feed information about any new equivalent elements not previously included in the web feed to generate and updated web feed; and
  communicating the updated web feed to the web feed user.

3. The method of claim 1 wherein receiving selection information from the web feed user comprises:
  detecting a click by the web feed user on a display of the selected element on the one or more remote web pages in the web page display area of the graphical user interface; and
  identifying the selected item based on the click.

4. The method of claim 1 wherein receiving selection information from the web feed user comprises:
  detecting interaction by the web feed user with data of the one or more remote web pages in the web page display area of the graphical interface to define user-defined equivalent elements that are equivalent to the selected element.

5. The method of claim 4 wherein defining a web feed comprises including in the web feed the selected element and the user-defined equivalent elements.

6. The method of claim 1 wherein determining structural similarities of the identified elements based at least on the one or more associated keys comprises:

for each respective identified element, calculating at least one key having data that describes structural characteristics of the respective identified element; and using the at least one key for the respective identified elements, determining the structural similarity between the respective identified elements.

7. The method of claim 6 further comprising:

automatically creating a new web feed using the at least one key.

8. The method of claim 7 further comprising:

retrieving additional web pages;

calculating key data for the retrieved additional web pages;

using the calculated key data with the at least one key, determining the structural similarity between a respective identified element and the retrieved additional web pages.

* * * * *